Patented Dec. 19, 1939

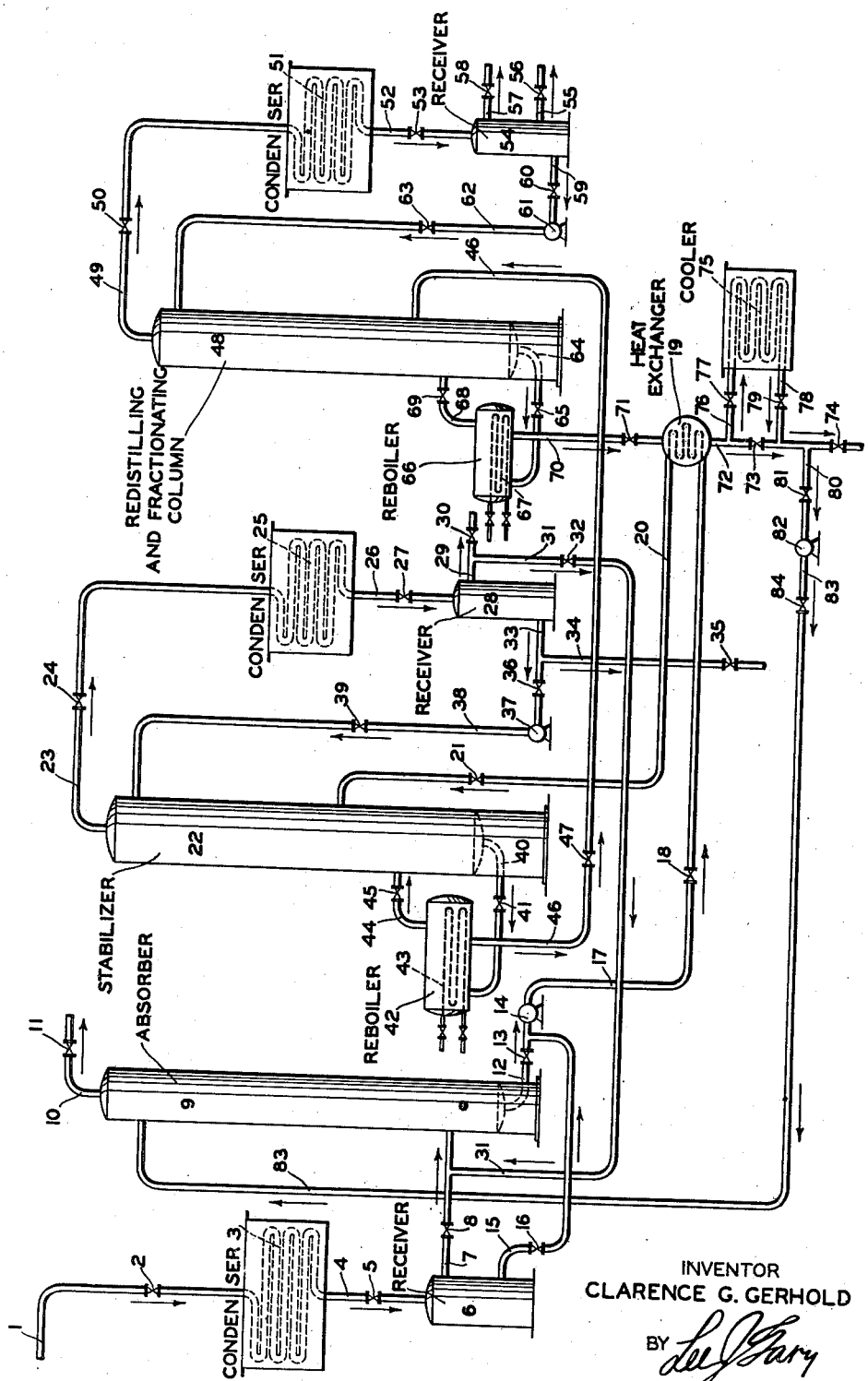

2,184,096

UNITED STATES PATENT OFFICE 2,184,096

TREATMENT OF HYDROCARBON OILS AND GASES

Clarence G. Gerhold, Chicago, Ill., assignor to Universal Oil Products Company, Chicago, Ill., a corporation of Delaware Application April 23, 1937, Serial No. 138,564

8 Claims. (Cl. 196—8)

This invention particularly refers to an improved process for treatment of the light distillate and the normally gaseous products of a cracking operation, said treatment including absorption of the desirable high-boiling components of said gases, stabilization of the distillate to free the same of any excess quantity of low-boiling components, such as entrained or dissolved normally gaseous products, and separation of the stabilized distillate into selected low-boiling and high-boiling fractions.

Catalytic polymerization of the high-boiling olefinic components (such as propene and butenes) of normally gaseous products resulting from the pyrolytic conversion of hydrocarbon oils is becoming an important step in modern refining practice as a means of converting what is otherwise a product of little value into high antiknock gasoline. One of the problems encountered in such processes has been the efficient separation of the gaseous conversion products into low-boiling fractions, substantially free of the desired readily polymerizable olefins, and high-boiling fractions, containing a high concentration of the desired readily polymerizable high-boiling olefins such as propene and/or butenes, in order to obtain a rich olefinic stock for the polymerization process and avoid loading up the polymerization equipment with non-reactive gases. It is also desirable to remove from the light distillate or gasoline product of the cracking operation any excess quantity of entrained or dissolved normally gaseous materials, for the two-fold purpose of reducing the vapor pressure of the gasoline to the desired degree and recovering the liberated gases, which are normally high in readily polymerizable olefins, for inclusion in the materials supplied to the polymerization system.

It is also often desirable, in modern cracking practice, to separate the gasoline product into relatively low-boiling and high-boiling fractions, since considerable economy results in treating the gasoline (for such purposes, for example, as reducing its color, gum and sulfur content and increasing its antiknock, color and gum stability) by separately subjecting its low-boiling and high-boiling fractions to different methods or different degrees of treatment.

The process of the present invention accomplishes stabilization of the distillate, recovery of the desired polymerizable gases separate from the lighter, less readily polymerized gases and separation of selected low-boiling and higher-boiling fractions of the distillate in a series of co-related and inter-dependent steps which result in operating economies and efficiencies which cannot be duplicated by conventional practice.

One specific embodiment of the invention comprises subjecting the overhead vaporous products from the fractionating step of a cracking operation to condensation whereby to roughly separate their normally liquid components, such as materials within the boiling range of gasoline, from lower-boiling normally gaseous products containing a substantial quantity of polymerizable olefins, contacting said gaseous products with a liquid absorption medium to recover therefrom, in said absorption medium, desirable high-boiling components including substantially all of the butenes and, when desired, a portion or all of the propene contained therein, removing the unabsorbed lower boiling gases from the system, combining the resultant enriched absorber oil with said distillate and subjecting the mixture to stabilization, involving reheating, partial vaporization and fractionation of the evolved vapors, whereby to produce a stabilized distillate of the desired vapor pressure and separately recover from the mixture a normally gaseous product containing a high concentration of readily polymerizable olefins, subjecting the last mentioned normally gaseous product to condensation to obtain a liquid product suitable for catalytic polymerization, supplying uncondensed gases from the last mentioned condensation step to the absorption step, maintaining a superatmospheric pressure in the stabilization step, subjecting the stabilized distillate to further vaporization and fractionation at substantially reduced pressure, whereby to separate the same into selected relatively low-boiling and high-boiling fractions, separately recovering said low-boiling and high-boiling fractions and supplying regulated quantities of the latter, as said liquid absorption medium, to the absorption step.

The accompanying diagrammatic drawing illustrates one specific form of apparatus wherein the process of the invention may be successfully conducted and the following description of the drawing includes a more detailed description of the operation in process:

Referring to the drawing, fractionated vaporous conversion products of the desired end-boiling point from the fractionator, not illustrated, of any form of cracking system wherein gases containing a substantial quantity of readily polymerizable olefins are produced, are directed through line 1 and valve 2 to condenser 3 wherein a light distillate product such as gasoline is condensed and wherefrom the resulting distillate and uncondensed gases pass through line 4 and valve 5 to collection and separation in receiver 6. The distillate collected in receiver 6 will contain varying quantities, depending primarily upon nature of the cracking operation and the temperature and pressure employed in the receiver, of entrained or dissolved normally gaseous conversion products, including propane, butane and the corresponding olefins, and this distillate is separated in receiver 6 from the uncondensed gases, which also normally contain high-boiling fractions, such as propane and butane and the corresponding olefins, as well as lower boiling gases, such as ethane, methane, etc.

The uncondensed gases are directed from receiver 6 through line 7 and valve 8 to absorber 9 wherein they are intimately contacted, by suitable means such as bubble trays, perforated pans, packing, or the like, not illustrated, with a liquid absorption medium, supplied to this zone as will be later described, capable of absorbing desirable high-boiling components of the gases, such as propene and butenes. The relatively low-boiling gases remaining unabsorbed are released from the upper portion of absorber 9 through line 10 and valve 11 to storage or elsewhere as desired. The enriched absorber oil, containing substantially all of the desired high-boiling fractions recovered from the gases in absorber 9, is withdrawn from the lower portion of this zone and directed through line 12 and valve 13 to pump 14, preferably being commingled in line 12 with the distillate withdrawn from receiver 6 through line 15 and valve 16. The commingled distillate and enriched absorber oil is directed from pump 14 through line 17 and valve 18 to heat exchanger 19 wherein they pass in indirect heat exchange with a relatively hot product of the process, supplied to this zone as will be later described, and are heated sufficiently to effect vaporization of their low-boiling fractions in stabilizer 22, to which they are supplied from heat exchanger 19 through line 20 and valve 21. It will, of course, be understood that any other suitable means of heating the commingled distillate and the enriched absorber oil may be utilized, when desired, either alone or in conjunction with the method illustrated. The invention also contemplates the elimination of pump 14, in case receiver 6 and absorber 9 are operated at a superatmospheric pressure sufficient to obtain the desired superatmospheric pressure in stabilizer 22 without the aid of a pump, or pump 14 may be employed for supplying the enriched absorber oil to stabilizer 22, in case an insufficient superatmospheric pressure for this purpose is utilized in absorber 9 but sufficient superatmospheric pressure is employed in receiver 6, in which case the distillate from the latter zone may be supplied to stabilizer 22 without the aid of a pump. Separate pumps may, of course, be utilized when desired for supplying the enriched absorber oil and the distillate from the receiver to the stabilizer.

In case the particular cracking system employed utilizes additional or auxiliary condensing, collecting and/or separating equipment (other than condenser 3 and receiver 6), wherefrom gases containing a substantial quantity of polymerizable olefins are recovered, the latter may also be supplied to absorber 9, by well known means, not illustrated, and the distillate from such separating zones may, when desired, be supplied by well known means, not illustrated, to stabilizer 22. It is also permissible within the scope of the invention to employ a single absorption, stabilization and redistilling system, such as herein provided, for distillate and/or gaseous products from any desired number of cracking units or from any other suitable source.

It will be apparent from the foregoing that the distillate and enriched absorber oil supplied to stabilizer 22, as previously described, will contain substantially all of the desirable high-boiling gases and will be substantially free of undesirable lower boiling gases. Stabilization of these commingled materials therefore serves the two-fold purpose of liberating therefrom any excess quantity of normally gaseous components over that required to produce a final distillate product of the desired vapor pressure and to recover the thus liberated gases separate from the stabilized distillate and separate from any substantial quantity of lower boiling gases which are not readily polymerizable.

Preferably, suitable fractionating means, not illustrated, are employed in stabilizer 22 to assist in establishing equilibrium conditions in this zone and the excess gases liberated from the distillate are directed from the upper portion of stabilizer 22 through line 23 and valve 24 to condenser 25 wherein at least a substantial quantity of the gases are condensed, the resulting distillate and any uncondensed gases being directed through line 26 and valve 27 to collection and separation in receiver 28. The uncondensed gases may be released from the receiver through line 29 and valve 30 to storage or elsewhere as desired, but preferably are directed, all or in part, from line 29 through line 31 and valve 32 to absorber 9 wherein they are contacted, as previously described, with the absorber oil. The distillate collected in receiver 28, which comprises a normally gaseous product containing a high concentration of readily polymerizable olefins, is withdrawn from this zone through line 33 and may be directed through line 34 and valve 35 to a suitable catalytic polymerization system, not illustrated, or to storage, or elsewhere as desired. Regulated quantities of the distillate collected in receiver 28 may be directed through valve 36 in line 33 to pump 37 by means of which they are returned through line 38 and valve 39 to the upper portion of stabilizer 22 to serve as a cooling and refluxing medium in this zone.

The distillate remaining unvaporized in stabilizer 22 may be directed from the lower portion thereof, through line 40 and valve 41 to reboiler 42 wherein it is subjected to further vaporization or reboiling by indirect heat exchange with a suitable heating medium passed through closed coil 43 in this zone. The vaporized fractions of the distillate are returned from reboiler 42 to stabilizer 22, through line 44 and valve 45. The stabilized and reboiled distillate is withdrawn from reboiler 42 and directed through line 46 and valve 47 to redistilling and fractionating column 48.

It is, of course, within the scope of the invention to reboil the unvaporized distillate in any well known manner, not illustrated, such as, for example, by passing the same through a heating coil, circulating a suitable heating medium through the lower portion of stabilizer 22, in indirect heat exchange with the distillate, or by directly commingling the distillate with a suitable heating medium, such as steam or a reheated portion of the same distillate, for example.

Preferably a substantial superatmospheric pressure is employed in stabilizer 22, since this favors retention of some of the high-boiling normally gaseous products in the stabilized distillate to give the same the desired vapor pressure (which is normally from 8 to 12 pounds per square inch, as determined by the Reid method) and thereby increases the yield of gasoline. Also the high pressure employed in stabilizer 22 may also be utilized to advantage in condenser 25 and receiver 28 in condensing and collecting the gases in liquid state without employing a refrigerant or a compressor and without utilizing an excessively large condenser. It should be noted that in the present process, the desired superatmospheric pressure is readily obtained in stabilizer 22 by means of a single liquid pump, or, in case the particular cracking process utilized permits the use of substantial superatmospheric pressure in receiver 6, stabilizer 22 may be operated at substantially the same or somewhat lower superatmospheric pressure without employing any pump for supplying the distillate thereto.

The stabilized distillate supplied, as above described, to redistilling and fractionating column 48, is subjected to flash distillation in this zone, by releasing or substantially reducing the superatmospheric pressure imposed thereon as it passes through valve 47 in line 46. Low-boiling fractions of the distillate are thereby vaporized and these vapors are preferably subjected to fractionation in column 48 by the use of suitable fractionating means, not illustrated, in this zone, such as bubble trays, perforated pans, packing, or the like. The stabilized distillate is thus separated into selected relatively low-boiling and high-boiling fractions.

The desired low-boiling fractions are removed in vaporous state from the upper portion of column 48 and directed through line 49 and valve 50 to condensation in condenser 51, wherefrom the resulting low-boiling distillate and any uncondensed gases are directed through line 52 and valve 53 to collection and separation in receiver 54. This low-boiling distillate may be withdrawn from receiver 54 through line 55 and valve 56 to storage or to any desired further treatment. Any uncondensed gases collected in receiver 54 may be released therefrom through line 57 and valve 58 to storage, or elsewhere as desired, and these gases may, when desired, be supplied to absorber 9, although well known means whereby this may be accomplished are not illustrated in the drawing. When desired, regulated quantities of the distillate collected in receiver 54 may be directed through line 59 and valve 60 to pump 61, whereby they are recirculated through line 62 and valve 63 to the upper portion of column 48, to serve as a cooling and refluxing medium in this zone.

The high-boiling fractions of the stabilized distillate which remain unvaporized in column 48 may be withdrawn from the lower portion of this zone and directed through line 64 and valve 65 to reboiler 66 wherein they are heated and reboiled by indirect heat exchange with a suitable heating medium passed through coil 67 in this zone. The evolved vapors are returned through line 68 and valve 69 to column 48. The final desired high-boiling fractions are withdrawn from reboiler 66 through line 70 and valve 71 to heat exchanger 19, wherein they are passed in indirect heat exchange with the commingled unstabilized distillate and enriched absorber oil passed through this zone, as previously described, supplying heat to the commingled materials prior to their introduction in stabilizer 22 and being thereby partially cooled. Alternative reboiling means, such as those previously mentioned, may, of course, be utilized, when desired, for effecting further vaporization of the distillate collected in the lower portion of column 48. The high boiling components of the distillate pass from heat exchanger 19 through line 72 and may be directed through valve 73 and 74 in this line to storage, or to any desired further treatment. Preferably, however, this material is subjected to further cooling in cooler 75, through which it may be directed by means of lines 76 and 78 controlled by the respective valves 77 and 79.

Regulated quantities of the high-boiling distillate from column 48, cooled to the desired temperature, are supplied from line 72 through line 80 and valve 81 to pump 82, by means of which they are fed through line 83 and valve 84 into absorber 9 wherein they serve as said absorption medium. These high-boiling fractions of the distillate are particularly desirable as absorber oil, for several reasons. They comprise a portion of the distillate collected in receiver 6 and will, therefore, not contaminate or deteriorate the quality of the distillate supplied to stabilizer 22, when commingled therewith. They comprise an oil boiling slightly higher, but fairly close to the boiling points of the materials which it is desired to absorb, which characteristic is highly desirable for efficient absorption and, in addition, they are substantially free of normally gaseous materials and, therefore, for a given quantity of absorber oil, will recover more of the desirable materials than an oil which already contains a substantial quantity thereof.

The process of the invention provides many advantageous features, some of which have been previously explained in some detail, while others will be apparent to those familiar with the art, and, although the various steps of the process cooperate to produce many of the advantageous results, the invention is not limited to all of the advantageous features disclosed in combination, nor to the specific form of apparatus illustrated and described, since many modifications of the same and minor departures therefrom may be employed and still retain many or all of the advantageous features of the process. It is, therefore, not intended to limit the invention, except as necessitated by the prior art and defined in the appended claims.

I claim as my invention:

1. A process of the character and for the purpose described, which comprises contacting normally gaseous products, containing a substantial quantity of polymerizable olefins such as propene and butenes, with an absorber oil substantially free of normally gaseous components, whereby to remove heavy components from said gases by absorption in said absorber oil, removing the unabsorbed lighter components of the gases from the system, subjecting the resultant enriched absorber oil and a low-boiling distillate containing high-boiling polymerizable olefinic gases to stabilization in commingled state, whereby to reduce the vapor pressure of the commingled materials to the desired degree by liberating excess normally gaseous components therefrom, subjecting the gases thus liberated from said commingled materials to condensation, recovering the resulting distillate, subjecting the stabilized commingled materials to further vaporization and fractionation whereby to separate the same into selected relatively low-boiling and high-boiling fractions, subjecting said low-boiling fractions to condensation, recovering the resulting distillate, separately removing said high-boiling fractions from the separating zone, and supplying regulated quantities thereof to the absorption step, as said absorber oil.

2. A process for separating a mixture of fractioned vaporous and gaseous conversion products resulting from the pyrolytic conversion of hydrocarbon oils into a gaseous product substantially free of readily polymerizable olefins, a product comprising normally gaseous materials containing a high concentration of readily polymerizable olefins and a distillate product, boiling within the gasoline range, which comprises subjecting said fractionated vapor-gas mixture to condensation, separating the resulting condensate and uncondensed fractions, absorbing heavy components of the latter, including normally gaseous polymerizable olefins such as propene and butenes, in an absorber oil having a boiling range within that of said condensate and substantially free of materials such as those which it is desired to absorb, recovering the unabsorbed material as said gaseous products substantially free of readily polymerizable olefins, commingling the resulting enriched absorber oil and said condensate and stabilizing the resultant mixture at the desired vapor pressure by liberating the excess of low-boiling components therefrom, recovering the latter as said product comprising normally gaseous materials containing a high concentration of readily polymerizable olefins, separating the stabilized mixture into selected relatively low-boiling and high-boiling fractions, returning regulated quantities of the latter to the absorption step as said absorber oil, and recovering said low-boiling fractions and that portion of said high-boiling fractions not recycled to the absorption step.

3. A combination absorption, stabilization and redistillation process of the character and for the purpose described which comprises separating readily polymerizable normaly gaseous olefins such as propene and butenes from lower-boiling and less readily polymerized components of a gaseous mixture containing both by absorption of the former in an absorber oil, commingling the resultant enriched absorber oil with a distillate of substantially gasoline boiling range, liberating the excess of normally gaseous components from the mixture, whereby to stabilize the same at the desired vapor pressure, recovering said liberated normally gaseous materials as a product containing a high concentration of readily polymerizable olefins, separating the stabilized mixture into selected relatively low-boiling and high-boiling fractions, recovering said low-boiling fractions, separately removing said high-boiling fractions from the zone of separation, and supplying regulated quantities thereof, as said absorber oil, to the zone of absorption.

4. A process for separating a mixture of fractionated vaporous and gaseous materials resulting from the pyrolytic conversion of hydrocarbon oils into various products, which comprises subjecting said fractionated mixture to condensation, separating the resulting distillate and uncondensed fractions, absorbing heavy components of the latter, including substantially all of the butenes and higher boiling fractions, in an absorber oil comprising selected high-boiling fractions of said distillate and substantially free of normally gaseous materials, removing the unabsorbed components of the gases from the system, commingling the resultant enriched absorber oil with said distillate, liberating the excess quantities of normally gaseous products from the commingled materials at substantial superatmospheric pressure, whereby to stabilize the latter at the desired vapor pressure, recovering the liberated normally gaseous materials from the stabilization step as a product containing a substantially higher proportion of polymerizable olefins than said uncondensed fractions subjected to said absorption, subjecting the commingled stabilized materials to further vaporization and fractionation at substantially reduced pressure relative to that employed in the stabilization step, whereby to separate the same into selected relatively low-boiling and high-boiling fractions, recovering said low-boiling fractions, separately removing said high-boiling fractions from the zone of said reduced pressure vaporization, recovering a regulated portion thereof and supplying another regulated portion thereof to the absorption step as said absorber oil.

5. In a process for the pyrolytic conversion of hydrocarbon oils wherein a distillate of substantially gasoline boiling range and a gaseous mixture containing a substantial quantity of readily polymerizable olefins are recovered and separated, the improvement which comprises supplying said gaseous mixture to an absorber, wherein selected heavy fractions thereof are separated from lighter fractions by absorption of said heavy fractions in an absorber oil comprising selected high-boiling fractions of said distillate, removing unabsorbed light gases from the absorber, separately removing the resultant enriched absorber oil from the absorber and commingling the same with said distillate, subjecting the commingled materials to further vaporization and fractionation in a stabilizer maintained at substantial superatmospheric pressure, removing normally gaseous products liberated from the commingled materials in said stabilizer therefrom, subjecting the same to condensation, recovering as the resultant distillate normally gaseous materials containing a high concentration of readily polymerizable olefins, returning uncondensed gases from the last mentioned condensation step to the absorber for further absorption, separately removing the stabilized commingled materials from the stabilization step, supplying the same to a redistilling and fractionating zone maintained at substantially reduced pressure relative to that employed in the stabilizer, whereby they are partially vaporized and separated into selected components comprising vaporous low-boiling fractions and high-boiling liquid fractions, subjecting said vaporous low-boiling fractions to condensation, recovering, as the resultant distillate, low-boiling gasoline fractions, separately removing said\ higher boiling liquid fraction from the redistilling zone, cooling and recovering regulated quantities thereof as high-boiling gasoline fractions, and returning another regulated quantity thereof, after cooling, to the absorber as said absorber oil.

6. A process for obtaining polymerizer charging stock from the separated pressure distillate of substantially gasoline boiling range and normally incondensible gases produced in the cracking of hydrocarbon oil, which comprises stabilizing said distillate of substantially gasoline boiling range to liberate dissolved 3 and 4 carbon atom hydrocarbons therefrom, separating the stabilized distillate into relatively light and heavy fractions, scrubbing said gases with at least a portion of the heavy fraction of the stabilized distillate to separate 3 and 4 carbon atom hydrocarbon components from the gases by absorption thereof in said portion of the heavy fraction, isolating from the process the unabsorbed gases of less than 3 carbon atoms, supplying the enriched portion of the heavy fraction to the aforesaid stabilizing step to free the same of the absorbed 3 and 4 carbon atom components of the gases and to combine these components with the first-mentioned 3 and 4 carbon atom hydrocarbons liberated from the distillate, and recovering as said polymerizer charging stock, independently of said unabsorbed gases, the overhead product of the stabilization comprising essentially 3 and 4 carbon atom hydrocarbon constituents of said distillate and incondensible gases.

7. A process for obtaining polymerizer charging stock from the separated pressure distillate of substantially gasoline boiling range and normally incondensible gases produced in the cracking of hydrocarbon oil, which comprises stabilizing said distillate of substantially gasoline boiling range to liberate dissolved butenes therefrom, separating the stabilized distillate into relatively light and heavy fractions, scrubbing said gases with at least a portion of the heavy fraction of the stabilized distillate to absorb butenes contained in the gases in said portion of the heavy fraction and to separate these butenes from lighter unpolymerizable components of the gases, isolating the unabsorbed gases from the process, supplying the enriched portion of the heavy fraction to the aforesaid stabilizing step to free the same of the absorbed butene content of the gases and to combine these butenes with the first-mentioned butenes liberated from the distillate, and recovering as said polymerizer charging stock, independently of said unabsorbed gases, the overhead product of the stabilization containing said butenes removed from the distillate and incondensible gases.

8. A process for obtaining polymerizer charging stock from the separated pressure distillate of substantially gasoline boiling range and normally incondensible gases produced in the cracking of hydrocarbon oil, which comprises stabilizing said distillate of substantially gasoline boiling range to liberate dissolved normally gaseous hydrocarbons therefrom, separating the stabilized distillate into relatively light and heavy fractions, scrubbing said incondensible gases with at least a portion of said heavy fraction to absorb in the latter heavier polymerizable components of the gases and to separate these components from lighter unpolymerizable components of the gases, isolating the unabsorbed gases from the process, supplying the enriched portion of the heavy fraction to the aforesaid stabilizing step to free the same of the absorbed heavier components of the gases and to combine these components with said normally gaseous hydrocarbons liberated from the distillate, and recovering as said polymerizer charging stock, independently of said unabsorbed gases, the overhead product of the stabilization.

CLARENCE G. GERHOLD.